(12) United States Patent
Tajiri et al.

(10) Patent No.: US 6,975,420 B2
(45) Date of Patent: Dec. 13, 2005

(54) COMMUNICATION CONNECTING DEVICE WITH A RELIABLE TRANSMISSION CAPABILITY AND A DATA OUTPUT CONTROL METHOD

(75) Inventors: Katsutoshi Tajiri, Saitama (JP); Takashi Noda, Tokyo (JP); Rika Kamimura, Gumma (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 798 days.

(21) Appl. No.: 09/933,140

(22) Filed: Aug. 21, 2001

(65) Prior Publication Data

US 2002/0077005 A1 Jun. 20, 2002

(30) Foreign Application Priority Data

Aug. 22, 2000 (JP) ............................. 2000-255727

(51) Int. Cl.[7] .......................................... G06F 15/00
(52) U.S. Cl. ..................................... 358/1.15
(58) Field of Search ................ 358/1.15; 379/100.12, 379/100.17; 370/352

(56) References Cited

U.S. PATENT DOCUMENTS

2002/0001373 A1 * 1/2002 Sakurai ................ 379/100.12

FOREIGN PATENT DOCUMENTS

EP 0 880 271 A2 11/1998
EP 0 892 527 A2 1/1999

OTHER PUBLICATIONS

"Procedures for Real Time Group 3 Facsimile Communication Over IP Networks" ITU-T, T.38, International Telecommunication Union., Series T: Terminals for Telematic Services, Jun. 1998.

* cited by examiner

Primary Examiner—Kimberly Williams
Assistant Examiner—Charlotte M. Baker
(74) Attorney, Agent, or Firm—Venable LLP; Michael A. Sartori; Catherine M. Voorhees (57) ABSTRACT

A communication connecting device includes a terminal unit controller for temporarily storing data received from a sending terminal unit. A packetizer/depacketizer collectively codes the data sequentially read out in accordance with size information fed from a size information storage. The packetizer/depacketizer determines whether or not the data is control data and delivers, if the answer of the decision is positive, a notification control signal to a control data monitor. A UDPTL (facsimile User Datagram Protocol Transport Layer protocol) controller feeds a UDPTL packet input from the packetizer/depacketizer to the control data monitor in accordance with ITU-T (International Telecommunication Union-Telecommunication standardization sector) Recommendation T.38. The control data monitor repeatedly sends the UDPTL packet on the basis of the notification control signal.

8 Claims, 7 Drawing Sheets

| IFP PACKET | | IFP PACKET No. INCLUDED IN UDPTL PACKET | | |
|---|---|---|---|---|
| No. | MEANING | PRIMARY | SECONDARY 1 | SECONDARY 2 |
| 01 | CED | 01 | × | × |
| 02 | FLGS | 02 | 01 | × |
| 03 | CSI | 03 | 02 | 01 |
| 04 | CSI/FCS | 04 | 03 | 02 |
| 05 | DIS | 05 | 04 | 03 |
| 06 | DIS/FCS | 06 | 05 | 04 |
| 07 | FLAGS | 07 | × | × |
| 08 | TSI/FCS | 08 | 07 | × |
| 09 | DCS/FCS | 09 | 08 | 07 |
| 10 | TRAINING | 10 | 09 | 08 |
| 11 | FLAGS | 11 | 10 | 09 |
| 12 | CFR | 12 | 11 | 10 |
| 13 | CFR/FCS | 13 | 12 | 11 |
| 14 | SPEED | 14 | 13 | 12 |
| 15 | IMAGE DATA 0 | 15 | 14 | 13 |
| 16 | IMAGE DATA 1 | 16 | 15 | 14 |
| 17 | IMAGE DATA 2 | 17 | 16 | 15 |
| 18 | IMAGE DATA 3 | 18 | 17 | 16 |
| − | IMAGE DATA | − | − | − |
| 78 | IMAGE DATA 63 | 78 | 77 | 76 |
| 79 | IMAGE DATA 64 | 79 | 78 | 77 |
| 80 | IMAGE DATA 65 | 80 | 79 | 78 |
| 81 | SIG/END | 81 | 80 | 79 |
| 82 | FLAGS | 82 | 81 | 80 |
| 83 | EOP/FCS | 83 | 82 | 81 |
| 84 | FLAGS | 84 | 83 | 82 |
| 85 | MCF | 85 | 84 | 83 |
| 86 | MCF/FCS | 86 | 85 | 84 |

COMMUNICATION CONNECTING DEVICE WITH A RELIABLE TRANSMISSION CAPABILITY AND A DATA OUTPUT CONTROL METHOD

BACKGROUND OF THE INVENTION

Field of the Invention

The present invention relates to a communication connecting device and a data output control method advantageously applicable to, e.g., a gateway that connects a G3 (Group 3) facsimile apparatus to an IP (Internet Protocol) network. More particularly, the present invention relates to a communication connecting device and a data output control method feasible for a real-time facsimile apparatus or terminal for sending UDP (User Datagram Protocol)/IP packets while monitoring the data of the packets.

Generally, for real-time facsimile communication over an IP network, a system configuration proposed by the ITU-T (International Telecommunication Union-Telecommunication standardization sector) Recommendation T.38 is used. In this system configuration, an Internet facsimile apparatus or gateway is connected to the IP network at each of the transmitter and receiver sides. The Internet facsimile apparatuses each are connected to a particular G3 facsimile apparatus by a PSTN (Public Switched Telephone Network).

The Internet facsimile apparatus at the transmitter side receives data from the sending G3 facsimile apparatus and temporarily stores the data. The facsimile apparatus then packetizes the data by referencing packet size information fed thereto. The resulting packets are referred to as IFP (Internet Facsimile Protocol) packets.

UDP is applied to communication between the Internet facsimile apparatuses. For example, a UDP header is added to the head of a UDP payload storing data. Even when UDP packet data is lost, UDP does not execute processing for reconstructing the packet data.

Specifically, the Internet facsimile apparatus at the transmitter side temporarily stores the IFP packets to be sent. The Internet facsimile apparatus then writes every new IFP packet in the primary field of its storage area to thereby generate a UDPTL (facsimile UDP Transport Layer protocol) payload and send the UDPTL payload to the IP network. In addition, to prepare for the loss of the UDP packet data, the Internet facsimile apparatus writes the UDP packets sent in the past in the secondary field of the storage area to thereby form a UDPTL payload although the past UDP packets are redundant. Sequence numbers unique to the primary field are attached to the primary field. A UDPTL header is added to the head of the UDPTL payload to complete a UDPTL packet. The UDP payload is constituted by such a UDPTL packet. A UDP packet is made up of a UDP header and a UDP payload.

After an IP header has been added to a UDP packet to form an IP packet, the IP packet is sent to the Internet facsimile apparatus at the receiver side via the IP network.

The Internet facsimile apparatus at the receiver side decomposes the received IP packet to the level of UDPTL packets. The Internet facsimile apparatus then classifies, among the decomposed UDPTL packets, IFP packets to be used and then depacketizes the classified IFP packets by decoding them, thereby restoring the original data. The Internet facsimile apparatus temporarily stores the restored data and then sends them to the receiving G3 facsimile apparatus.

In the above-described communication system, control data included in a V.21 channel 2 signal, which is based on Recommendation T.30, is sent and received the same number of times as image data. Stated another way, the control data and image data are equivalent to each other as to the reliability of transfer over the IP network. However, should the control data be not surely sent or received, communication would end in a defective way. It is therefore preferable that the control data be sent and received with higher reliability than image data.

As to communication using the UDP protocol proposed by Recommendation T.38, the sending internet facsimile apparatus sets IFP packets in the primary and secondary fields a plurality of times to thereby send data with redundancy, as stated earlier. While this kind of scheme is directed toward reliable communication, it fails to insure reliable transmission of control data to a destination.

SUMMARY OF THE INVENTION

It is an object of the present invention to provide a communication connecting device and a data output control method capable of distinguishing the kinds of data to be sent to thereby enhance reliable transmission of control data.

In accordance with the present invention, a communication connecting device is connected at one end to a first terminal unit and connected at the other end to a second terminal unit via an IP network, and selectively operable with a plurality of communication standards adaptive to the first terminal unit, second terminal unit and IP network for thereby implementing real-time communication. The communication connecting device includes a terminal unit control circuit for storing data received from the first terminal unit or the second terminal unit, and controlling the first terminal unit in accordance with a first communication standard. A first storage stores size information representative of the size of data to be collectively coded. A coding/decoding circuit collectively codes the data in accordance with the size information read out of the first storage and the first communication standard and determines whether or not the data is control data relating to control of data or decodes coded data received from the second terminal unit in accordance with the first communication standard. A second storage stores, assuming the loss of the coded data output from the coding/decoding circuit, the coded data. An information adding/separating circuit adds a header and data, which makes up for the loss of the coded data assumed, to the coded data in accordance with a second communication standard relating to the IP network or separates coded data from data received from the second terminal unit and feeds the separated coded data to the coding/decoding circuit. A control monitoring circuit causes, in response to a notification control signal output from the coding/decoding circuit to show that the data is the control data, the control data to be repeatedly read out of the second storage. An interfacing circuit converts the coded data input via the control monitoring circuit to a signal based on a command or converts a signal received from the second terminal unit to the coded data.

Also, in accordance with the present invention, a data output control method applicable to a communication connecting device of the type described begins with a step of storing data received from the first terminal unit or the second terminal unit. Size information representative of the size of data to be collectively coded is output. The data read out in accordance with the size information and a first communication standard are collectively coded. Subsequently, whether or not coded data produced in the second step is control data for control of data is determined. A notification control signal is output if the coded data is control data. The coded data are stored on the assumption of the loss of the coded data. A header for the coded data and the coded data stored on the assumption of the loss of the coded data are read out in accordance with a second communication standard relating to the IP network and combined. The control data read out a plurality of times in response to the notification control signal are sent with the transmission condition of the control data being monitored. The coded data are converted to a signal based on a command and then output.

BRIEF DESCRIPTION OF THE DRAWINGS

The objects and features of the present invention will become more apparent from consideration of the following detailed description taken in conjunction with the accompanying drawings in which:

FIG. 5 shows how FIGS. 5A and 5B are combined;

DESCRIPTION OF THE PREFERRED EMBODIMENT

Figure 1:
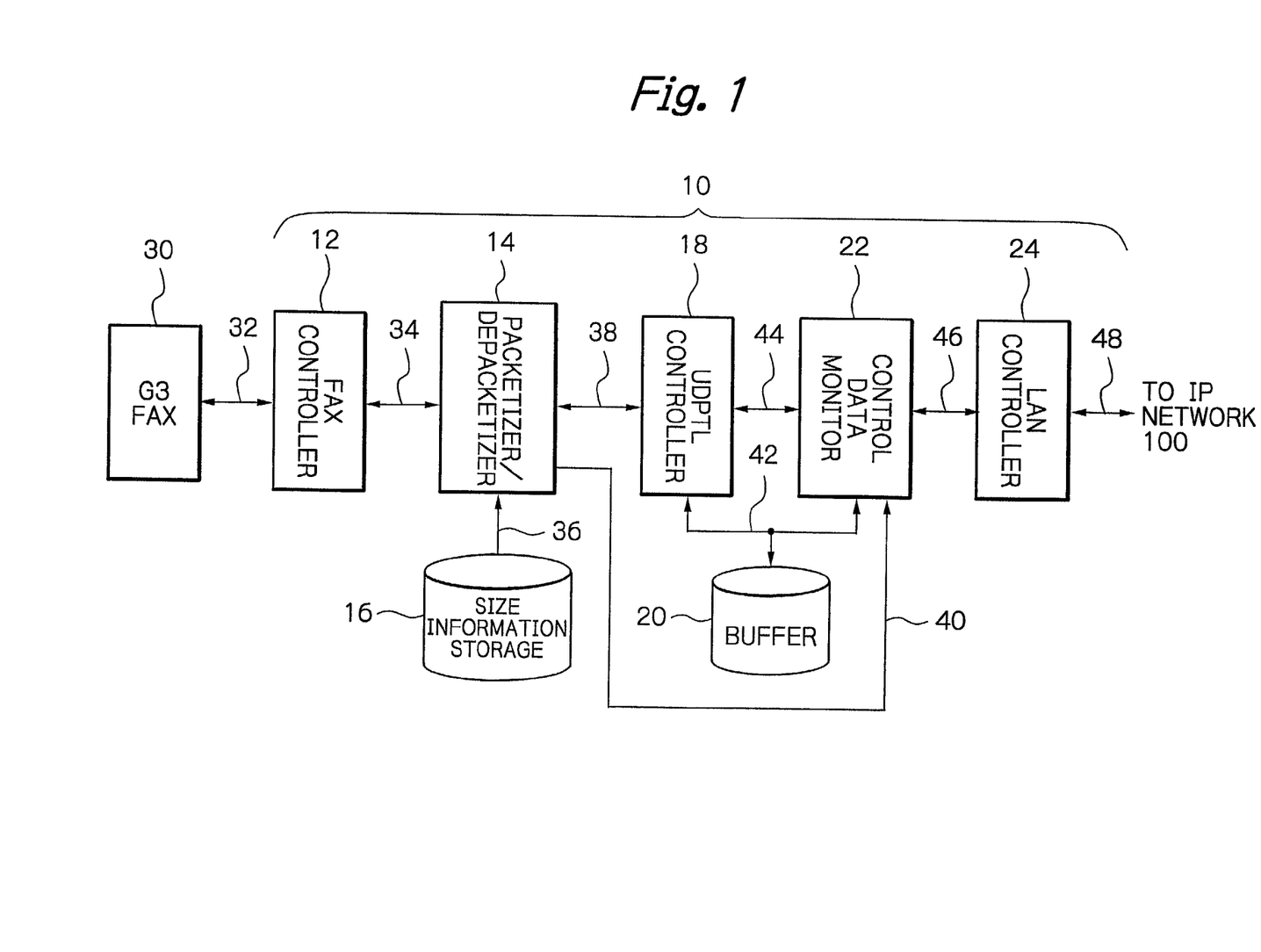
FIG. 1 is a schematic block diagram showing a preferred embodiment of the communication connecting device in accordance with the present invention and implemented as an Internet facsimile apparatus by way of example.

Referring to FIG. 1 of the drawings, an Internet facsimile apparatus or terminal (Internet FAX hereinafter) 10 to which a communication connecting device embodying the present invention is applied will be described. Part of the Internet FAX 10 not relevant to the understanding of the present invention is neither shown nor will be described specifically. Signals are designated by reference numerals attached to signal lines on which they appear.

As shown in FIG. 1, the Internet FAX 10 includes a FAX controller 12, a packetizer/depacketizer 14, a size information storage 16, a UDPTL controller 18, a buffer 20, a control data monitor 22, and a LAN (Local Area Network) controller 24. An analog G3 facsimile apparatus (G3 FAX hereinafter) 30 is connected to the Internet FAX 10 and operates in accordance with Recommendation T.30 (revised in 1996).

The FAX controller 12 includes a non-destructive memory for storing data and has an interface function for converting signals meant for the G3 FAX 30, although not shown specifically. The non-destructive memory is capable of repeatedly outputting data 32 input from the G3 FAX 30. The FAX controller 12 selectively controls the write-in of the data 32 or the read-out of data 34 in accordance with a control signal fed from a system controller not shown. The data 34 read out of the memory are fed to the packetizer/depacketizer 14. When the Internet FAX 10 is a receiving terminal, the packetizer/depacketizer 14 depacketizes received data while the FAX controller 12 stores the resulting depacketized and decoded data 34.

The packetizer/depacketizer 14 includes a packetizing circuit and a depacketizing circuit although not shown specifically. The size information storage 16 stores information representative of the size of a single packet beforehand. The storage 16 feeds packet size information 36 to the packetizer/depacketizer 14. The packetizing circuit divides the input data 34 into packets each having the packet size indicated by the information 16. The packetizing circuit then delivers coded IFP packets 38 to the buffer 20 and UDPTL controller 18. The depacketizing circuit decodes and depacketizes coded IFP packets 38 input from the UDPTL controller 18.

The packetizer/depacketizer 14 additionally includes a decision circuit for determining whether or not the input data 34 is control data, although not shown specifically. If the data 34 is control data, then the decision circuit feeds a notification control signal 40 to the control data monitor 22.

The UDPTL controller 18 produces a UDPTL payload including the IFP packet data 38 in accordance with Recommendation T.38. The UDPTL payload consists of a primary field corresponding to a packet number and a secondary field storing an IFP packet or packets having been sent. More specifically, the past data stored in the buffer 20 are fed to the secondary field although redundant. If desired, an error correction code may be fed to the secondary field in addition to the past data. The IP packet data 38 are delivered also to the buffer 20 via the UDPTL controller 18 and a signal line 42.

The UDPTL controller 18 adds a UDPTL header to the head of the UDPTL payload to thereby complete a UDPTL packet, which is a UDP payload. The UDPTL controller 18 delivers the UDPTL packet 44 to the control data monitor 22.

In the event of receipt, a received UDPTL packet 44 having the above-described layered data structure is input to the UDPTL controller 18. The UDPTL controller 18 divides the received UDPTL packet 44 into IFP packets and then feeds necessary IFP packet data 38 to the packetizer/depacketizer 14.

Figure 2:
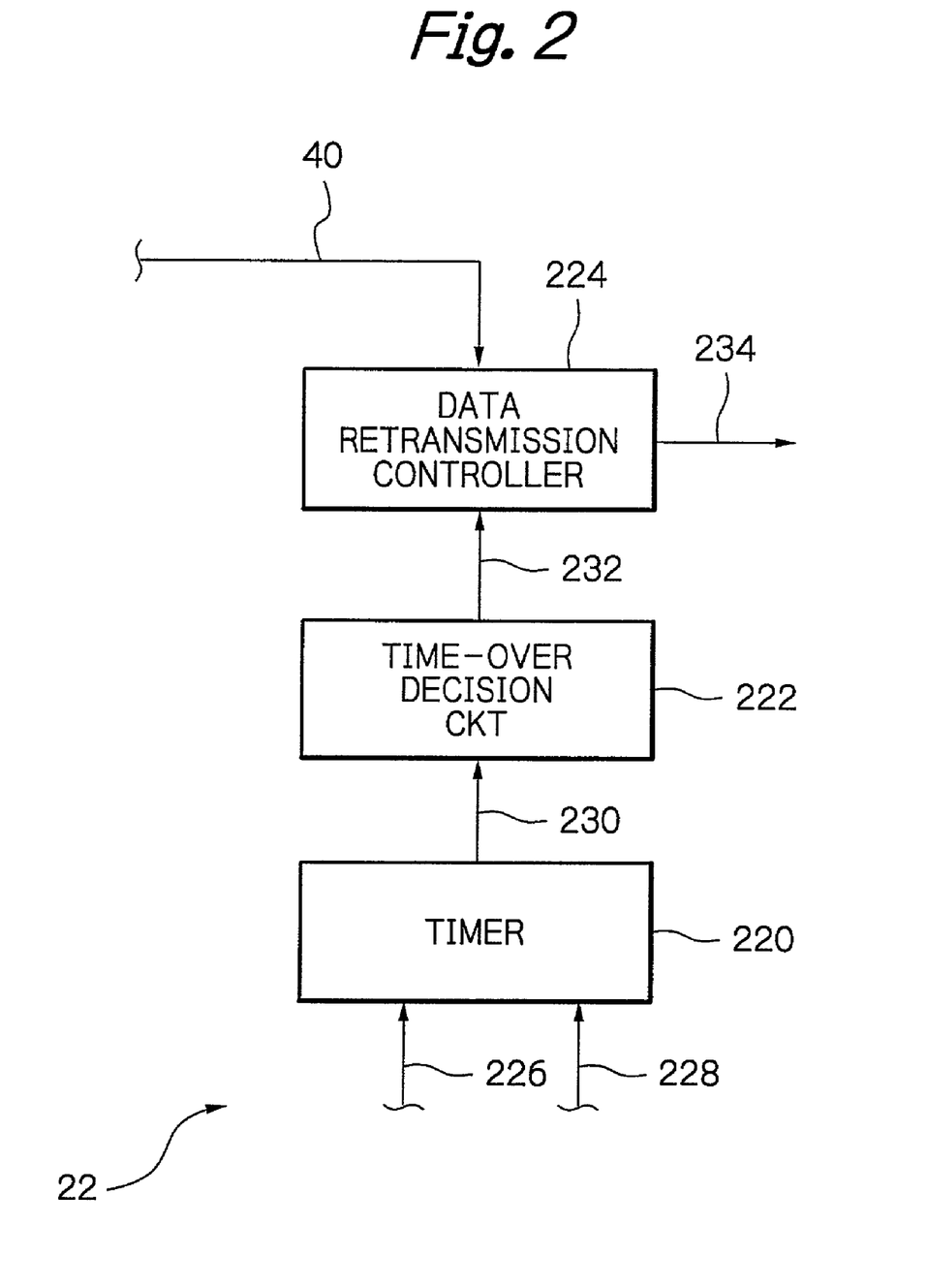
FIG. 2 is a schematic block diagram showing a specific configuration of a control data monitor included in the illustrative embodiment.

As shown in FIG. 2 specifically, the control data monitor 22 includes a timer 220, a time-over decision circuit 222, and a data retransmission controller 224. While monitoring the data, the control data monitor 22 directly delivers the UDPTL packet 44 to the LAN controller 24 as a UDPTL packet 46. A timing signal 226 is input to the timer 220 when the last one of a sequence of data to be sent is fed from the control data monitor 22 to the LAN controller 24. In response to the timing signal 226, the timer 220 starts counting time and intermittently feeds a period of time 230 to the time-over decision circuit 222 at preselected intervals. Subsequently, the timer 220 stops counting time in response to a timing signal 228 input thereto when a receiving terminal returns an answer on the receipt of the data.

The time-over decision circuit 222 compares the period of time 230 fed from the timer 220 with a preselected reference period of time T. If the period of time 230 is longer than the reference period of time T, then the time-over decision circuit 222 determines that time is over, and feeds an error signal 232 to the data retransmission controller 224. When the time-over decision circuit 222 receives the period of time 230 after the time-over, the circuit 222 may or may not output the error signal 232 again.

The notification control signal 40 output from the packetizer/depacketizer 14, FIG. 1, is also input to the data retransmission controller 224. The notification control signal 40 and error signal 232 enable the data retransmission controller 224 when input thereto together. In the enabled state, the data retransmission controller 224 delivers a retransmission control signal 234 to the UDPTL controller 18 and buffer 20. When control data is fed or when time-over occurs, the UDPTL packet 46 is again delivered to the LAN controller 24 under the control of the control data monitor 22 as data to be re-transmitted.

In the illustrative embodiment, the control data monitor 22 feeds the retransmission control signal 234 to the UDPTL controller 18 and buffer 20, as stated above. Alternatively, the monitor 22 may include a buffer memory, not shown, for storing the UDPTL packet 36. In such a case, the monitor 22 stores the UDPTL packet 46 while delivering it to the LAN controller 24 and then reads out the UDPTL packet 46 and again transmits it at the next output timing.

Further, the above-mentioned buffer memory of the control data monitor 22 may be replaced with an exclusive region formed in the buffer 20 for storing the UDPTL packet 44. In this case, the UDPTL controller 18 delivers the UDPTL packet not only to the control data monitor 22 but also to the buffer 20 so as to store it for a moment. In the event of retransmission, the control data monitor 22 feeds the retransmission control signal 234 to the buffer 20 in order to read the UDPTL packet 44 out of the buffer 20. The UDPTL packet 44 is then routed through the signal line 42 and control data monitor 22 to the LAN controller 24.

Referring again to FIG. 1, the LAN controller 24 adds a UDP header to the UDPTL packet or UDP payload 46 to thereby complete a UDP packet. Assume that data are interchanged by use of an IFP/UDPTL/UDP/IP layer model by way of example. Then, a UDP packet corresponds to an IP payload. In this case, the LAN controller 24 adds an IP header to an IP payload to thereby generate an IP packet. The LAN controller 24 transforms the IP packet 46 to an analog signal and sends the analog signal 48 to the IP network 100. The LAN controller 24 additionally has an interface function for matching the level of an electric signal to a protocol assigned to the IP network.

As stated above, the Internet FAX 10 outputs control data more frequently than in the case of transmission of other data, e.g., image data.

In the sending G3 FAX or terminal unit 30, a scanner, not shown, transforms data read out of a document to a corresponding electric signal and sends the electric signal in accordance with the G3 standard, which is proposed by Recommendation T.30. Specifically, the operator of the G3 FAX 30 lays documents, which are paper sheets or similar recording media, on a tray, not shown, which is mounted on the G3 FAX 30. The operator then inputs a read command on an operation panel, not shown, also mounted on the G3 FAX 30. In response, the scanner starts scanning the documents with light. The scanner senses the intensity of reflection from part of each document where data is present and the intensity of reflection from the other part of the same and transforms each of them to a corresponding electric signal. An analog-to-digital converter, not shown, digitizes the electric signal and outputs the resulting digital signal or data 32 having tonality. The data 32 are sent to the FAX controller 12 via a PSTN 32.

Figure 3:
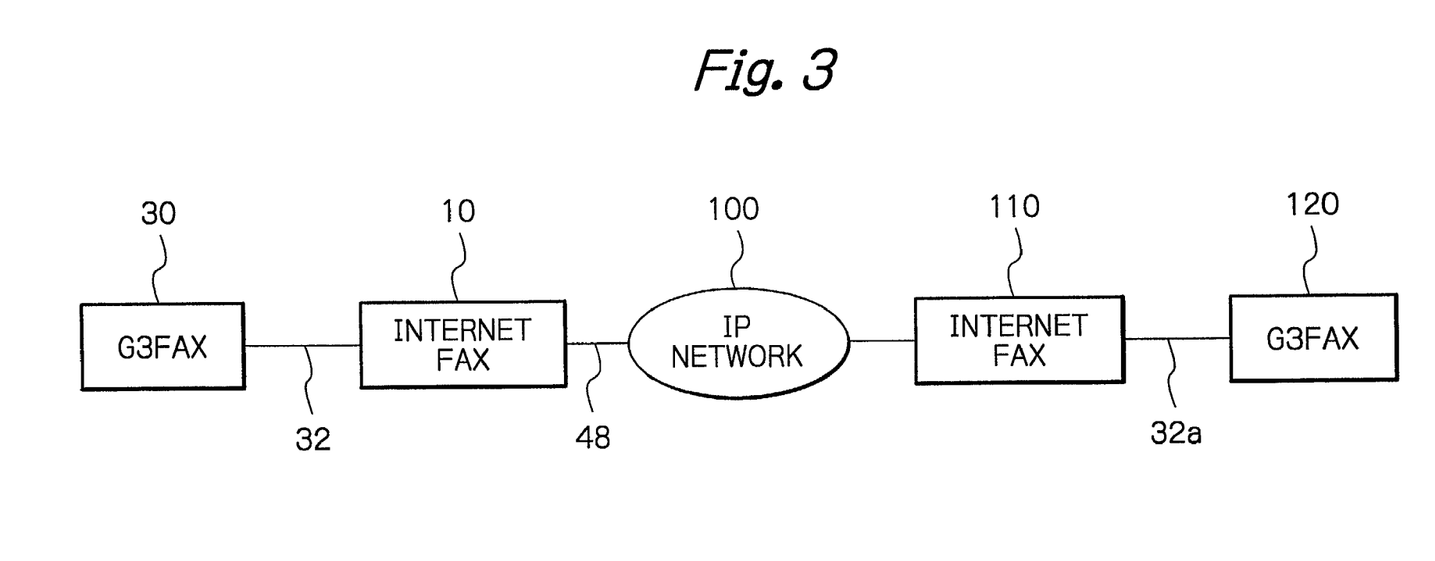
FIG. 3 is a schematic block diagram showing gateways connected to each other via an IP network and each being implemented by the Internet facsimile apparatus shown in FIG. 1.

As shown in FIG. 3, the real-time Internet FAX 10 is connected to another real-time Internet FAX 110 via an IP network 100. The Internet FAX 110 is connected to a G3 FAX 120 via a PSTN 32a. It will be seen that the Internet FAX 10, IP network 100 and Internet FAX 110 constitute a communication domain conforming to the Recommendation T.38 protocol. The PSTN 32a between the Internet FAX 110 and the G3 FAX 120 conforms to the Recommendation T.30 protocol. The system shown in FIG. 3 terminals at the G3 FAXs 30 and 120.

A real-time facsimile communication sequence generally executed by the system of FIG. 3 will be described hereinafter. The UDPTL controller 18, FIG. 1, writes every IFP packet in the primary field as new data while writing the past data sent in the secondary field in accordance with Recommendation T.38, thereby generating a UDPTL packet.

Figure 4:
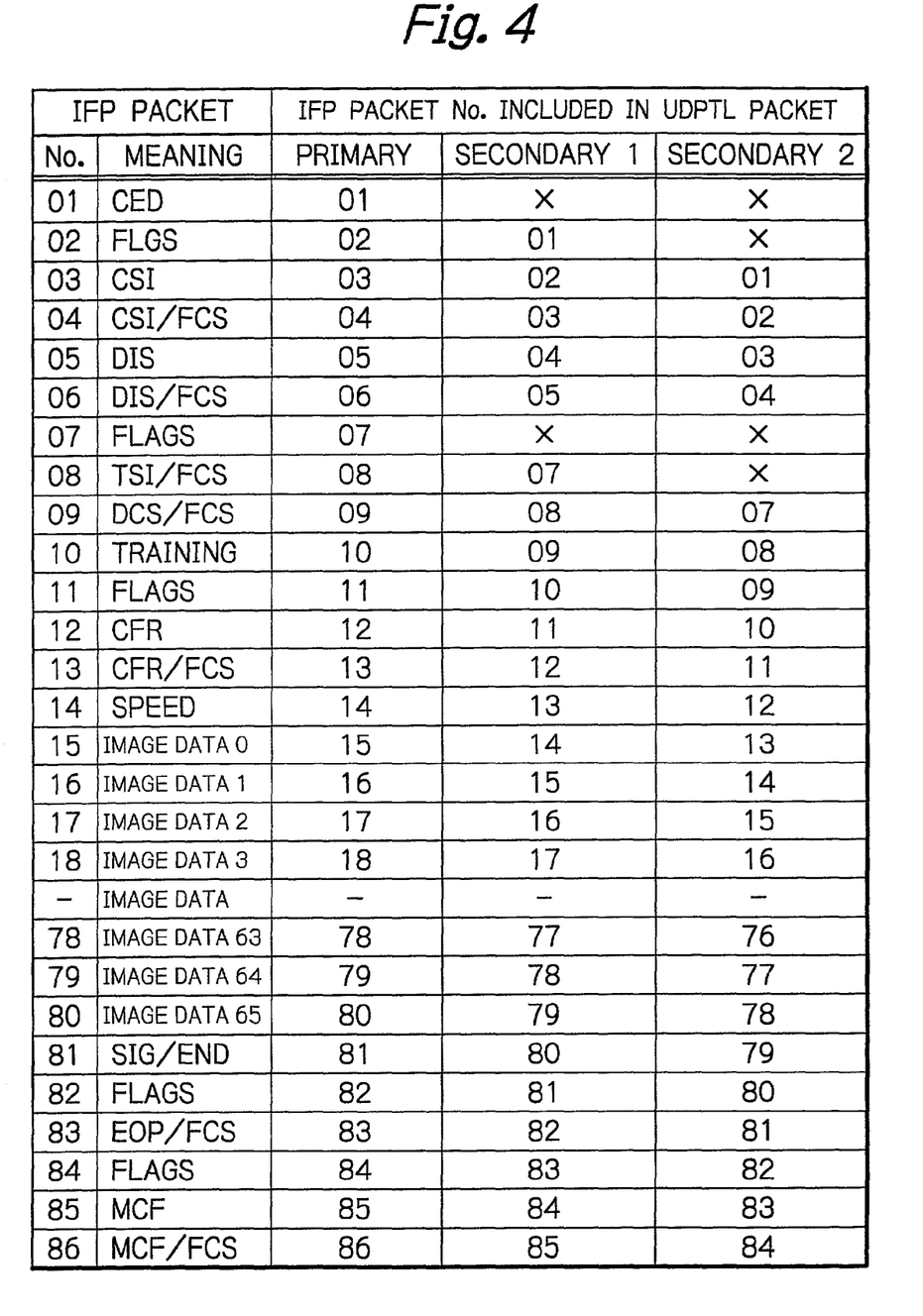
FIG. 4 shows a table useful for understanding a relation between IFP packets and the primary and secondary fields of UDPTL packets.

Specifically, a UDP payload generated by the UDPTL controller 18 includes a UDPTL header and a UDPTL payload, as stated earlier. FIG. 4 shows the data structure of a UDPTL payload. As shown, the UDPTL payload includes a primary and a secondary field. In the illustrative embodiment, the secondary field is made up of a first and a second secondary field 1 and 2, respectively. The packetizer/depacketizer 14, FIG. 1, feeds the IFP packets to the buffer 20, FIG. 1, under the control of the system controller, as stated previously. The IFP packets are written to the primary field. The UDPTL controller 18 sequentially shifts the IFP packets read out of the buffer 20 from the secondary field 1 to the secondary field 2 in accordance with the number of times of transmission. Two or more IFP packets may be written to the secondary fields, if necessary.

Three IFP packets are stored in a UDPTL packet at positions shown in FIG. 4. In FIG. 4, numbers (Nos.) attached to the IFP packets are not sequence numbers originally given during transmission or receipt, but are serial numbers for easy, convenient identification of the packets. The serial numbers each identify a particular stored packet. FIG. 4 shows a specific case wherein eighty-six IFP packets are dealt with.

Figure 5A:
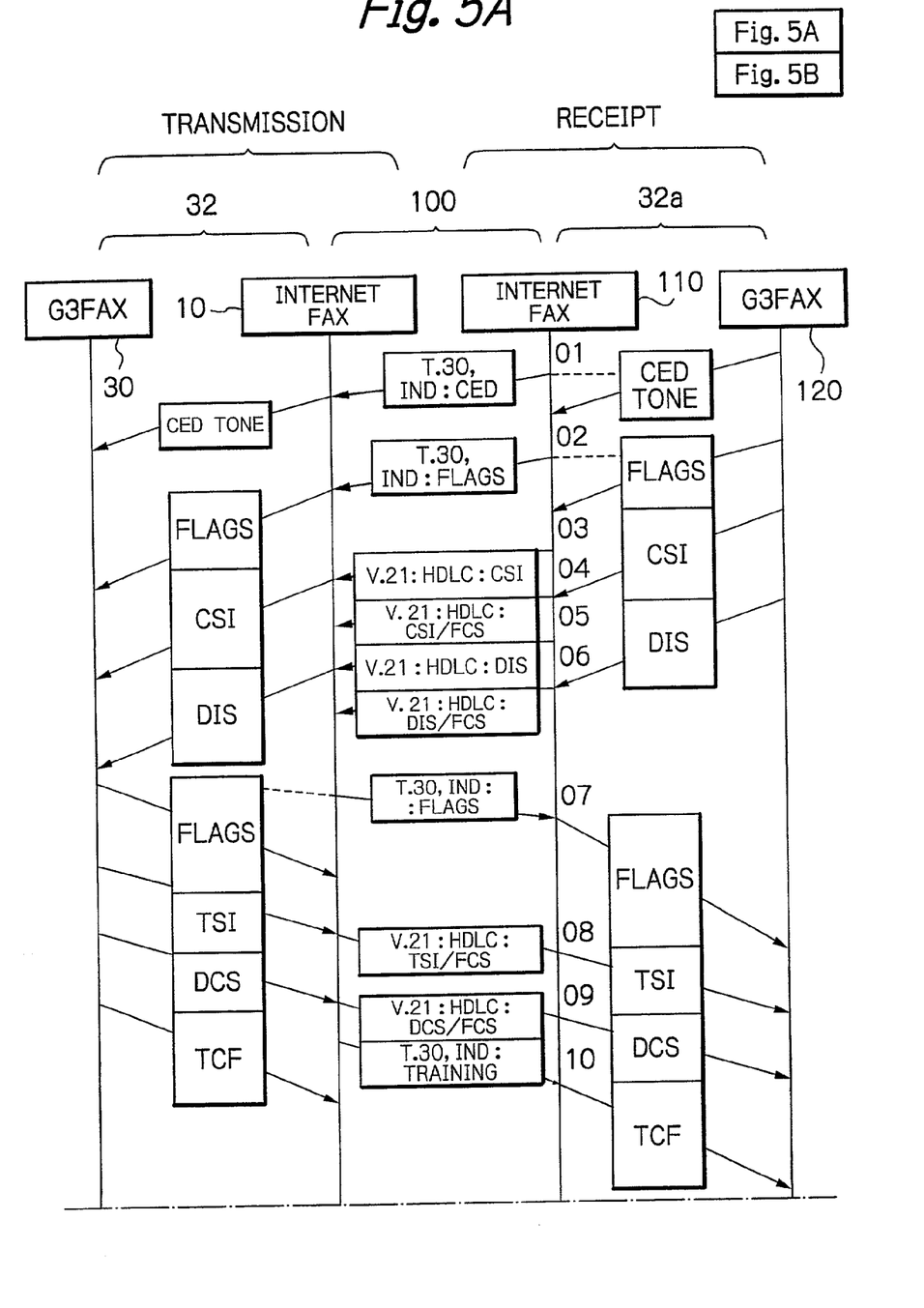
FIGS. 5A and 5B demonstrate a specific conventional Internet facsimile communication sequence.
Figure 5B:
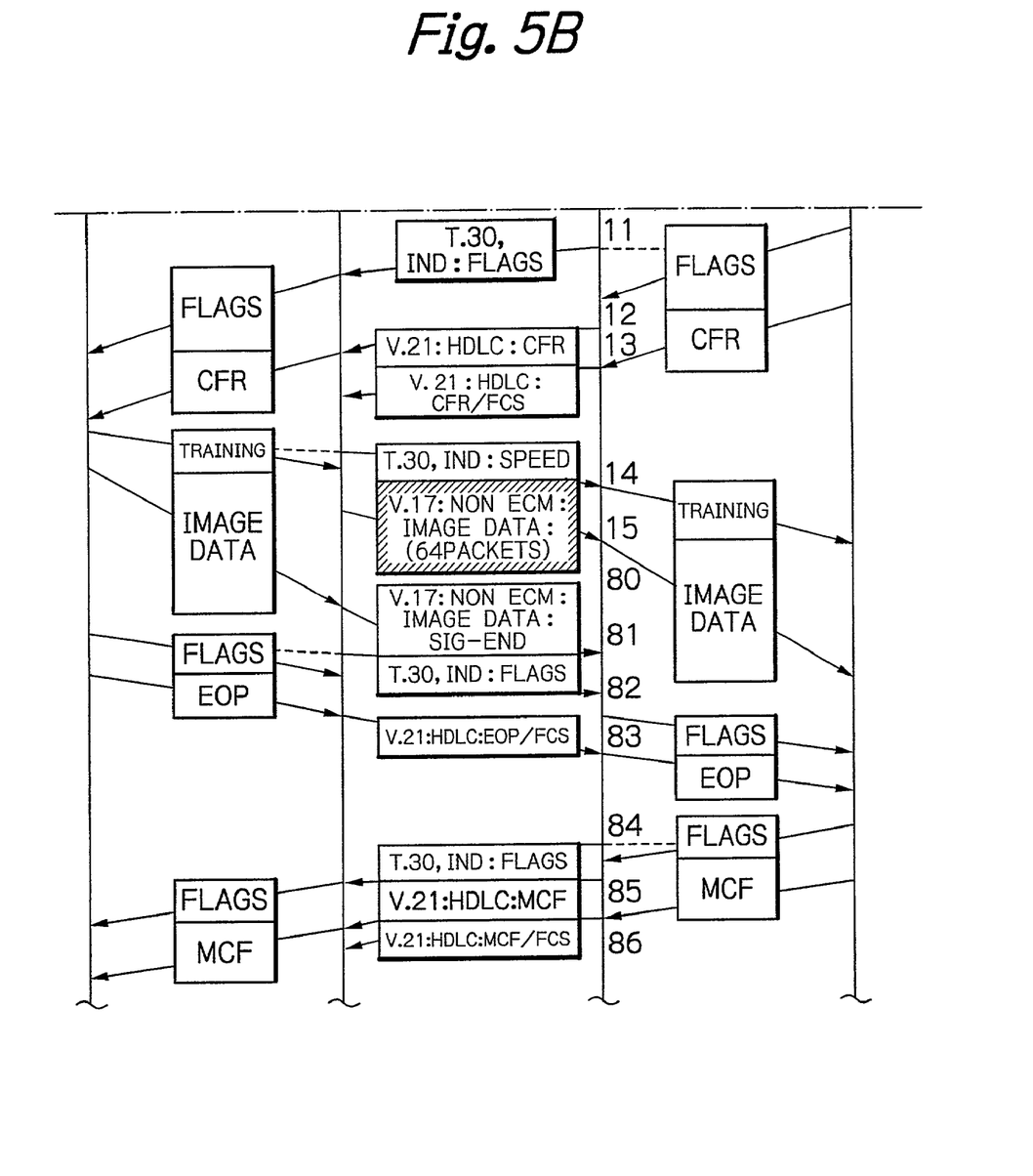

Reference will be made to FIGS. 5A and 5B for describing a conventional real-time communication sequence effected with the eighty-six IFP packets shown in FIG. 4. Numbers 01 through 86 shown in FIGS. 5A and 5B are the serial numbers attached to the IFP packets, but have nothing to do with sequence numbers in the UDPTL packet. Also, in FIGS. 5A and 5B, packets shown on the IP network 100 between the Internet FAXs 10 and 110 are representative of the primary field of the UDPTL packet.

First, as shown in FIG. 5A, the receiving G3 FAX 120 sends four consecutive commands CED (CallEd station iDentification) tone, Flags, CSI (Called Station Identification) and DIS (Digital Identification Signal) to the Internet FAX 110. In response, IFP packets respectively corresponding to the received commands are input to the UDPTL controller of the Internet FAX 110. The UDPTL controller generates, based on Recommendation T.38, UDPTL packets each storing particular initial data (numbers 02 through 06; control data CSI/DIS according to Recommendation T.30). The Internet FAX 110 packetizes the received UDPTL packets and sends the resulting IP packet to the Internet FAX 10 over the IP network 100. The Internet FAX 10 separates the UDPTL packets and IFP packets from the UDP payloads of the IP packet and decodes the separated packets, thereby reconstructing the four commands. The Internet FAX 10 then sends the four commands to the G3 FAX 30.

The transmitting G3 FAX 30 packetizes four commands Flags, TSI (Transmitting Station Identification), DCS (Digital Command Signal) and TCF (Training Check) corresponding to the received four commands. The G3 FAX 30 then sends the resulting UDPTL packets (IFP packets numbers 07 through 10) to the G3 FAX 120 via the Internet FAXs 10 and 110.

Subsequently, as shown in FIG. 5B, the receiving G3 FAX 120 sends two commands Flags and CFR (Confirmation to Receive) to the Internet FAX 110. The Internet FAX 110 packetizes the received commands into three packets (11 through 13) and sends them to the sending G3 FAX 30 via the Internet FAX 10 as reconstructed commands. In response, the sending G3 FAX 30 sends a training command (Training), determining that communication has been set up. The training command controls a modem, not shown, included in the receiving G3 FAX 120. Thereafter, the sending G3 FAX 30 sequentially sends stored image data and commands Flags and EOP to the Internet FAX 10. In response, the Internet FAX 10 sends to the Internet FAX 110 IFP packets numbers 15 through 81 as image data and IFP packets numbers 82 through 83 as commands Flags and EOP/FCS (End Of Procedure/Frame Check Sequence). The Internet FAX 110 sends the received image data and reconstructed two commands Flags and EOP to the G3 FAX 120. Finally, G3 FAX 120 sends Flags, MCF (Message ConFirmation) and MCF/FCS (Message ConFirmation/Frame Check Sequence) for message confirmation to G3 FAX 30 via the Internet FAXs 110 and 10. Then, the conventional real-time communication sequence for image data ends.

As the sequence shown in FIGS. 5A and 5B indicates, control data including flags and commands have customarily been sent only the same number of times as image data. The Internet FAXs 10 and 110 each send, based on Recommendation T.38, a UDPTL packet storing not only the current data but also the past data in its secondary field. While this promotes sure communication, the feed of control data available at the current stage of development is not fully satisfied in reliability yet.

In light of the above, in the illustrative embodiment, the packetizer/depacketizer 14 determines whether or not data fed from the FAX controller 12 is control data. If the input data is control data, then the packetizer/depacketizer 14 delivers the notification control signal 40 to the control data monitor 22. In response to the signal 40 or when time-over occurs, the control data monitor 22 again sends the control data. This procedure unique to the illustrative embodiment will be described more specifically with reference to FIG. 6.

Figure 6:
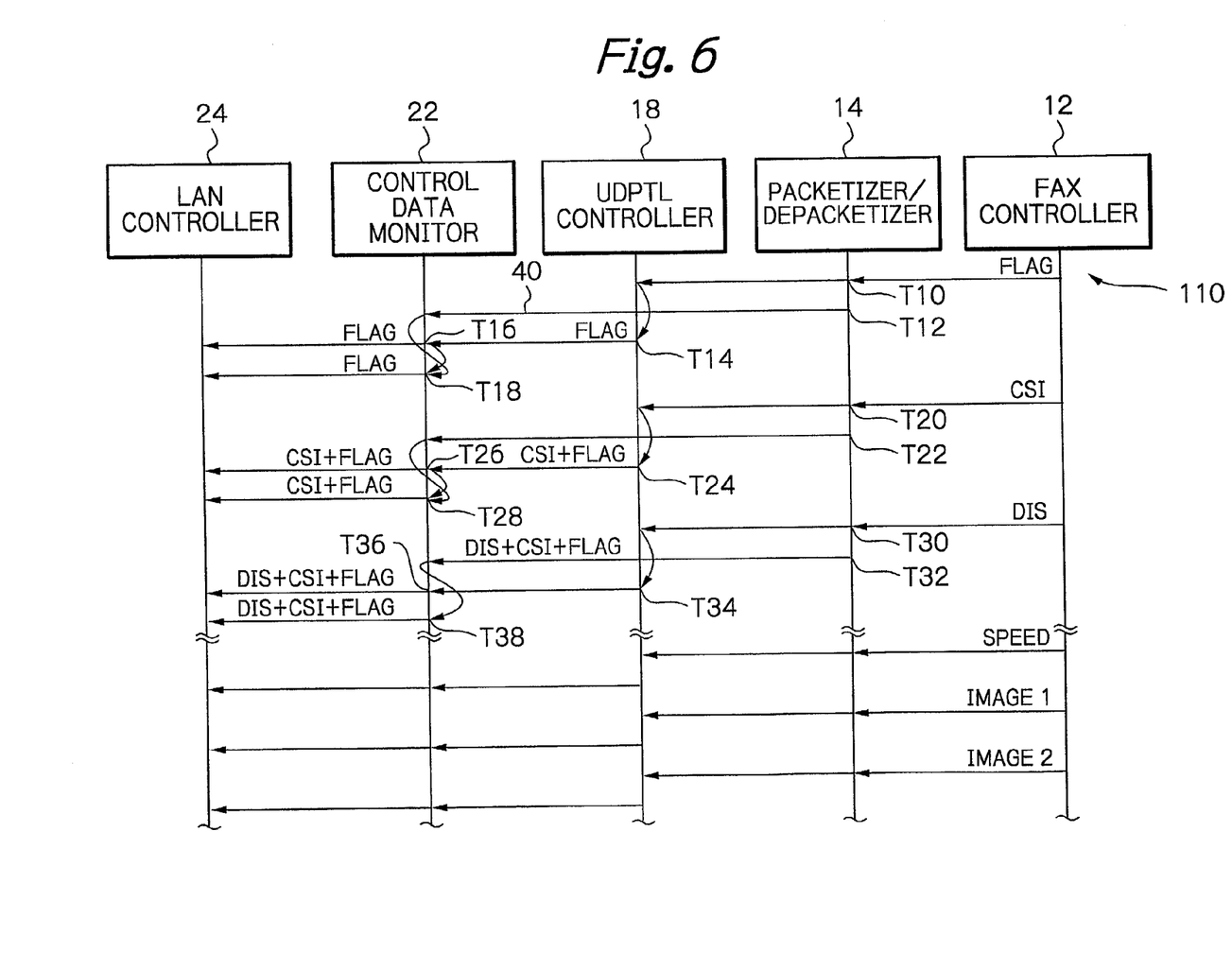
FIG. 6 shows an Internet facsimile communication sequence unique to the illustrative embodiment.

FIG. 6 demonstrates the transmission from the receiving Internet FAX 110 in order to clearly show the difference between the sequence of the illustrative embodiment and the conventional real-time communication sequence. Because the structural elements of the Internet FAX 110 are identical with the structural elements of the Internet FAX 10, the former is designated by the same reference numerals as the latter.

First, the FAX controller 12 feeds a flag to the packetizer/depacketizer 14 (T10). The packetizer/depacketizer 14 packetizes the flag and then delivers it to the UDPTL controller 14. At the same time, the packetizer/depacketizer 14 determines that the flag is control data, and feeds the notification control signal 40 to the control data monitor 22 (T12). The UDPTL controller 18 determines that the input IFP data is meant for the primary field, and writes it in the primary field of the buffer 20. At this stage, no data are stored in the secondary field.

The UDPTL controller 18 combines the IFP flag packet and the data of the secondary field to thereby produce a UDPTL payload. The controller 18 then adds a UDPTL header to the UDPTL payload for thereby generating a UDPTL packet (T14) and delivers the UDPTL packet to the LAN controller 24 via the control data monitor 22 (T16). The control data monitor 22, already informed of the fact that the UDPTL packet is control data, feeds the retransmission control signal 234 to the UDPTL controller 18 and buffer 20. In response, the UDPTL controller 18 again generates the UDPTL packet and delivers it to the control data monitor 22. Consequently, the control data monitor 22 again sends the UDPTL packet representative of the flag. If desired, the control data monitor 22 may repeat the transmission in the step T16 for the delivery of the UDPTL packet to the LAN controller 24 (T16).

Subsequently, the FAX controller 12 feeds a CSI signal to the packetizer/depacketizer (T20). The packetizer/depacketizer 14 packetizes the CSI signal and delivers the resulting packet to the UDPTL controller 18. At the same time, the packetizer/depacketizer 14 determines that the CSI signal is control data, and feeds the notification control signal 40 to the control data monitor 22 (T22). The UDPTL controller 18 determines that the input IFP packet is meant for the primary field, and writes it in the primary field of the buffer 20. At this stage, the flag data is present in the secondary field.

The UDPTL controller 18 combines the IFP CSI signal packet and the flag data of the secondary field to thereby produce a UDPTL payload. The controller 18 then adds a UDPTL header to the UDPTL payload for thereby generating a UDPTL packet (T24) and delivers the UDPTL packet to the LAN controller 24 via the control data monitor 22 (T26). Again, the control data monitor 22, already informed of the fact that the UDPTL packet is control data, feeds the retransmission control signal 234 to the UDPTL controller 18 and buffer 20. In response, the UDPTL controller 18 again generates the UDPTL packet and delivers it to the control data monitor 22. Consequently, the control data monitor 22 again transmits the UDPTL packet representative of the CSI signal and flag (T28). Again, the control data monitor 22 may repeat the transmission processing in the step T26.

Further, the FAX controller 12 feeds a digital identification signal (DIS signal hereinafter) to the packetizer/depacketizer 14 (T30). The packetizer/depacketizer 14 packetizes the DIS signal and feeds the resulting packet to the UDPTL controller 18. At the same time, the packetizer/depacketizer 14 determines that the DIS signal is control data, and feeds the notification control signal 40 to the control data monitor 22 (T32). The UDPTL controller 18 determines that the input IFP packet is meant for the primary field, and writes it in the primary field of the buffer 20. At this stage, the CSI signal and flag data are present in the secondary field.

The UDPTL controller 18 combines the IFP DIS signal packet and the CSI signal and flag data of the secondary field to thereby produce a UDPTL payload. The controller 18 then adds a UDPTL header to the UDPTL payload for thereby generating a UDPTL packet (T34) and delivers the UDPTL packet to the LAN controller 24 via the control data monitor 22 (T36). Again, the control data monitor 22, already informed of the fact that the UDPTL packet is control data, feeds the retransmission control signal 234 to the UDPTL controller 18 and buffer 20. In response, the UDPTL controller 18 again generates the UDPTL packet and delivers it to the control data monitor 22. Consequently, the control data monitor 22 again transmits the UDPTL packet representative of the DIS signal, CSI signal and flag (T38). Again, the control data monitor 22 may repeat the transmission processing in the step T36.

By contrast, data Speed and image data Image1 and Image2 each are sent only once in the form of a packet. This is because the packetizer/depacketizer 14 determines that such data are not control data, and does not output the notification control signal 40.

As stated above, when data, including data meant for the redundant secondary field of Recommendation T.38, is control data, the illustrative embodiment sends the control data a plurality of times during a single real-time communication sequence. That is, the illustrative embodiment repeatedly sends the control data while distinguishing it from, e.g., image data. This realizes far more reliable transmission of control data than the conventional sequence. The control data can therefore be sent to the destination surely enough to obviate the defective end of communication.

It is noteworthy that control data, as distinguished from image data, is low in transmission rate and therefore does not need a frequency band as broad as a frequency band assigned to image data in spite of the repeated transmission. This obviates a short frequency band despite the repeated transmission of control data. While the illustrative embodiment has been shown and described as sending only control data a plurality of times, it may send even all IFP packets a plurality of times. The Internet FAXs 10 and 110 each may be provided with the function of a G3 facsimile apparatus.

Of course, the present invention is not limited to an Internet facsimile apparatus for real-time facsimile communication, but can repeatedly send control data even with software.

In summary, it will be seen that the present invention provides a communication connecting device capable of obviating the defective end of communication and insuring real-time communication. The device of the present invention therefore promotes the transmission of control data over an IP network far surer than the transmission of image data.

The entire disclosure of Japanese patent application No. 2000-255727 filed on Aug. 22, 2000, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A communication connecting device connected at one end to a first terminal unit and connected at the other end to a second terminal unit via an IP network, and selectively operable with a plurality of communication standards adaptive to said first terminal unit, said second terminal unit and said IP network for thereby implementing real-time communication, said device comprising:

a terminal unit control circuit for storing data received from the first terminal unit or the second terminal unit, and controlling said first terminal unit in accordance with a first communication standard;

a first storage storing size information representative of a size of data to be collectively coded;

a coding/decoding circuit for collectively coding the data in accordance with the size information read out of said first storage and the first communication standard and determining whether or not said data is control data relating to control of data or decoding coded data received from the second terminal unit in accordance with said first communication standard;

a second storage for storing, assuming a loss of the coded data output from said coding/decoding circuit, said coded data;

an information adding/separating circuit for adding a header and data, which makes up for the loss of the coded data assumed, to said coded data in accordance with a second communication standard relating to the IP network or separating coded data from data received from the second terminal unit and feeding said coded data separated to said coding/decoding circuit;

a control data monitoring circuit for causing, in response to a notification control signal output from said coding/decoding circuit to show that the data is the control data, said control data to be repeatedly read out of said second storage; and an interfacing circuit for converting the coded data input via said control monitoring circuit to a signal based on a command or converting a signal received from the second terminal unit to the coded data.

2. The device in accordance with claim 1, wherein said coding/decoding circuit comprises a data discriminating circuit for determining whether or not the coded data is the control data, and outputting the notification control signal if said coded data is said control data.

3. The device in accordance with claim 1, wherein said control data monitoring circuit comprises:

a timer for starting counting time in response to an output of the control data to thereby count a period of time up to a receipt of an answer to said control data from a destination;

a comparing circuit for comparing the period of time counted by said timer and a preselected reference period of time; and a retransmission control circuit for causing, when said comparing circuit determines that the period of time counted is longer than the reference period of time, the control data sent during counting of time to be again sent to the destination.

4. The device in accordance with claim 2, wherein said control data monitoring circuit comprises:

a timer for starting counting time in response to an output of the control data to thereby count a period of time up to a receipt of an answer from a destination;

a comparing circuit for comparing the period of time counted by said timer and a preselected reference period of time; and a retransmission control circuit for causing, when said comparing circuit determines that the period of time counted is longer than the reference period of time, the control data sent during counting of time to be again sent to the destination.

5. The device in accordance with claim 4, wherein the first communication standard and the second communication standard respectively correspond to ITU-T Recommendation T.30 (revised in 1996) and Recommendation T.38 (June/1998), and wherein said first terminal unit and said second terminal unit comprise G3 (Group 3) facsimile apparatuses corresponding to Recommendation T.30 (revised in 1996).

6. A data output control method for a communication connecting device connected at one end to a first terminal unit and connected at the other end to a second terminal unit via an IP network, and selectively operable with a plurality of communication standards adaptive to said first terminal unit, said second terminal unit and said IP network for thereby implementing real-time communication, said method comprising:

a first step of storing data received from the first terminal unit or the second terminal unit;

a second step of outputting size information representative of a size of data to be collectively coded;

a third step of collectively coding the data in accordance with the read out size information and a first communication standard, determining whether or not coded data produced in the second step is control data for control of data, and outputting a notification control signal if said coded data is said control data;

a fourth step of storing the coded data on the assumption of a loss of said coded data;

a fifth step of reading out, in accordance with a second communication standard relating to the IP network, a header for the coded data and the coded data stored on the assumption of the loss of said coded data, and combining said header and said coded data;

a sixth step of sending the control data read out a plurality of times in response to the notification control signal, while monitoring a transmission condition of said control data; and a seventh step of converting the coded data to a signal based on a command and outputting said signal.

7. The method in accordance with claim 6, wherein said sixth step comprises:

an eighth step of starting counting time in response to an output of the control data and counting time up to a receipt of an answer to said control data from a destination; and a ninth step of causing the control data sent during counting of time to be again sent when the period of time counted exceeds a preselected reference period of time.

8. The method in accordance with claim 7, wherein the first communication standard and the second communication standard respectively correspond to ITU-T Recommendation T.30 (revised in 1996) and Recommendation T.38 (June/1998), and wherein said first terminal unit and said second terminal unit comprise G3 facsimile apparatuses corresponding to Recommendation T.30 (revised in 1996).

* * * * *